United States Patent [19]

Hsieh

[11] Patent Number: 4,552,851

[45] Date of Patent: Nov. 12, 1985

[54] FORMATION OF YTTRIUM ALUMINATE AS SINTERING AID FOR SILICON NITRIDE BODIES

[75] Inventor: Martin Y. Hsieh, Palo Alto, Calif.

[73] Assignee: GTE Products Corporation, Stamford, Conn.

[21] Appl. No.: 606,047

[22] Filed: May 2, 1984

[51] Int. Cl.[4] ............................................. C04B 35/58
[52] U.S. Cl. ....................................... 501/98; 264/65;
264/332; 501/97; 501/152; 501/153; 501/154
[58] Field of Search ................... 501/98, 154; 264/332, 264/65; 423/600

[56] References Cited

U.S. PATENT DOCUMENTS

| | | | |
|---|---|---|---|
| 3,950,464 | 4/1976 | Masaki | 264/332 |
| 4,071,371 | 1/1978 | Milberg | 501/98 |
| 4,127,416 | 11/1978 | Lumby et al. | 501/154 |
| 4,175,117 | 11/1979 | Hill | 423/600 |
| 4,401,617 | 8/1983 | Ezis et al. | 264/332 |
| 4,410,636 | 10/1983 | Minjolle et al. | 264/65 |
| 4,443,394 | 4/1984 | Ezis | 264/65 |
| 4,510,107 | 4/1985 | Ezis et al. | 264/65 |

FOREIGN PATENT DOCUMENTS 50-128708  10/1975  Japan .
2011952A   7/1979  United Kingdom .

OTHER PUBLICATIONS

Morozova, L. P. et al., "Synthesis of Aluminum Yttrium Garnet", Glass & Ceram (USA), vol. 35, No. 3-4, pp. 158-161, Mar.-Apr. 1978.
Chemical Abstracts, vol. 99, No. 8, Aug. 31, 1983, Abstract 57477j, Litvinenko, V. F. et al., "Thermophysical Properties of a Material Based on Aluminum Nitride and Yttrium Oxide".

Primary Examiner—Helen M. McCarthy
Attorney, Agent, or Firm—Donald R. Castle

[57] ABSTRACT

A process is disclosed for reacting oxides of yttrium and aluminum.

6 Claims, No Drawings

FORMATION OF YTTRIUM ALUMINATE AS SINTERING AID FOR SILICON NITRIDE BODIES

FIELD OF THE INVENTION

This invention relates to a process for forming a yttrium aluminum compound which can be used in a silicon nitride composition which can be consolidated to form silicon nitride bodies of high density.

In general, silicon nitride by itself has limited usage. In order to produce materials for turbines, cutting tools, wear parts and the like, composites are needed which can be pressed to near theoretical density; that is, greater than about 96% of the theoretical density. U.S. Pat. Nos. 3,950,464 and 3,953,221 cite compositions of silicon nitride and sintering aids such as yttrium oxide and aluminum oxide to aid in densification. However, there is a possibility of yttrium oxide reacting with the silicon during processing resulting in a nonhomogenous product. By pre-reacting the yttrium oxide with an oxide of aluminum which is another densification agent, the reaction of the yttrium oxide with the silicon during processing is essentially eliminated and a homogeneous dense product can be formed.

The process of this invention involves the reaction of mixtures of the oxides of yttrium and aluminum to form a yttrium aluminum compound which when used in a silicon nitride composition results in a body of high density on consolidation.

SUMMARY OF THE INVENTION

In accordance with one aspect of this invention, there is provided a process for reacting oxides of yttrium and aluminum.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

This process of pre-reacting the oxides of aluminum and yttrium has processing advantages such as prevention or reduction of the composition segregation of the yttrium and aluminum oxides in a silicon nitride composition used for slip casting or tape casting. Pre-reacting the oxides of yttrium and aluminum results in the close proximity of the yttrium and aluminum, thus increasing the reaction kinetics of the sintering process.

The oxide of yttrium used in this invention can be any oxide of yttrium. A suitable yttrium oxide is sold by Molycorp, a subsidiary of Union Oil of California under the trade name of Molycorp 5600. The oxide of aluminum used in this invention can be any oxide of aluminum. A suitable aluminum oxide is sold by Barkowski International Corporation under the trade name of CR-30. The admixture of yttrium and aluminum oxides is formed by any conventional method such as ball milling, blending and the like which will result in a homogeneous mixture.

As previously mentioned, the process of pre-reacting the oxides of yttrium and aluminum reduces the potential or segregation of the oxides in certain processes. Therefore, the weight ratio of yttrium oxide to aluminum oxide can vary from about 1 to 10 to about 10 to 1 and the benefits of this invention can be achieved. If a single phase is desired, there are two phases that are single phase materials. They are $Y_4Al_2O_9$ having a yttrium to aluminum atomic ratio of about 2 to 1 and $Y_6Al_{10}O_{24}$ having a yttrium to aluminum atomic ratio of about 3 to 5. Heating temperatures are generally from about 1000° C. to about 1450° C. Heating times are generally from about 3 hours to about 20 hours with from about 3 hours to about 5 hours being preferred. Higher temperatures and longer heating times result in the complete conversion to yttrium aluminate.

The yttrium aluminum mixtures are mixed with silicon nitride and the mixture is consolidated preferably by hot pressing or hot isostatic pressing to form a body having a density greater than about 96% of the theoretical density. A process for forming silicon nitride bodies of high density from silicon nitride compositions containing yttrium and silicon compounds is set forth in U.S. Pat. No. 4,350,771, assigned to GTE Laboratories, Incorporated.

To more fully illustrate this invention, the following non-limiting example is presented. All parts, portions, and percentages are on a weight basis unless otherwise stated.

EXAMPLE

About 452 parts of yttrium oxide and about 102 parts of aluminum oxide are mixed and heated at about 1080° C. for about 3 hours in order to react the above materials. The major phase is identified as $Y_4Al_2O_9$. This reacted material can be mixed with silicon nitride and conventional binders for tape casting and with organic or aqueous mixtures for slip casting.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process for producing silicon nitride bodies wherein a sintering aid is used, the improvement comprising forming said sintering aid by a process comprising:
    (a) forming an admixture of the oxides of yttrium and aluminum in a weight ratio of yttrium to aluminum of from about 10 to 1 to about 1 to 10 and
    (b) heating said admixture at a sufficient temperature and for a sufficient time to form at least some of a yttrium aluminum compound having an atomic ratio of yttrium to aluminum of either about 2 to 1 or about 3 to 5.

2. A process according to claim 1 wherein said admixture is heated at from about 1000° C. to about 1450° C.

3. A process according to claim 1 wherein said admixture is heated for from about 3 hours to about 5 hours.

4. A process according to claim 1 wherein said reacted material consists essentially of at least about 50% of a yttrium aluminum compound.

5. A process according to claim 1 wherein the process for producing silicon nitride bodies is slip casting.

6. A process according to claim 1 wherein the process for producing silicon nitride bodies is tape casting.

* * * * *